United States Patent Office 3,471,425
Patented Oct. 7, 1969

3,471,425
STOVING LACQUERS BASED ON SPONTANE-
OUSLY CROSS-LINKING ALKYD RESINS AND
ALPHA-ALKOXYALKYL ISOCYANATES
Heinz Ehring, Krefeld-Verberg, and Bernd Peltzer and
Hans-Joachim Kreuder, Krefeld, Germany, assignors
to Farbenfabriken Bayer Aktiengesellschaft, Lever-
kusen, Germany, a corporation of Germany
No Drawing. Filed May 31, 1967, Ser. No. 642,343
Claims priority, application Germany, May 31, 1966,
F 49,350; July 26, 1966, F 49,785; Dec. 17, 1966,
F 50,992
Int. Cl. C08g 17/16, 17/14; C09b 3/64
U.S. Cl. 260—22                                         4 Claims

ABSTRACT OF THE DISCLOSURE

Stoving lacquers are prepared from alkyd resins and alpha-alkoxyalkyl isocyanates, the lacquer having an acid number of from about 5 to about 50, an hydroxyl number of from about 20 to about 180, and an average molecular weight of from about 500 to about 10,000. The alkyd resins may be modified with fatty acids.

---

This invention relates to stoving lacquers curable upon heating and to a method of preparing the same. More particularly, it relates to alkyd type stoving lacquers.

It has been heretofore known that nonvolatile lacquer bases can be obtained from oil-modified or oil-free alkyd resins in combination with melamine-, benzo-guanamine- or urea-formaldehyde resins. These composite bases are difficult to store because the amino resins and alkyd resins from which they are prepared are not sufficiently compatible with each other. Further, lacquer films obtained from these bases are often inadequate especially with regard to gloss, elasticity, bond strength and resistance to chemicals.

Dutch patent application No. 66.01400 relates to a process for the production of self cross-linkable alkyd resins, in which alkyd resins containing Zerewitinoff-active hydrogen atoms are reacted with alkoxymethyl isocyanates. Self-cross-linking means that these substances form cross-links without the addition of cross-linking agent (e.g. a multivalent monomer). Cross-links are formed by a reaction which involves only the polymer itself and which is started by catalytic means (e.g. heat). Lacquer films prepared from such self-cross-linking alkyd resins as binders by heating show some unsatisfactory properties, particularly in regard to their hardness, because the binder is often not cross-linked to the required degree. In order to obtain hardened (fully cross-linked) lacquer films under practical conditions, for example heating for 30 minutes at 150° C., acid catalysts have to be added to these self-cross-linking alkyd resins. Examples of acid catalysts suitable for this purpose include p-toluene sulphonic acid, phosphoric acid, hydrochloric acid or boric acid, as well as other organic and inorganic acids. Unfortunately, these low-molecular-weight catalysts make the lacquers thus prepared difficult both to process and to store. The acid catalysts are frequently deposited or crystallize out with the result that the lacquer film shows superficial irregularities, for example in the form of incrustation, through migration of the catalysts, coupled with poor weather resistance due to catalyst residues which are not incorporated in the lacquer film.

It is therefore an object of this invention to provide improved stoving lacquers. It is another object of this invention to provide an improved process for preparing stoving lacquers. It is still another object of this invention to provide stoving lacquers having improved gloss, elasticity, bond strength and resistance to chemicals.

The foregoing objects and others that become apparent from the following description are accomplished in accordance with the invention, generally speaking, by providing a stoving lacquer which will spontaneously cure upon the application of heat from a reaction product of an alkyd resin containing active hydrogen atoms which are reactive with NCO groups and an alpha-alkoxy-alkyl isocyanate, said reaction product having an acid number of from 5 to about 50, an hydroxyl number of from about 20 to about 180 and an average molecular weight of from about 500 to about 10,000. The alkyd resin suitable in accordance with the invention may be an oil-modified alkyd resin, that is, one having incorporated $C_8$–$C_{30}$ saturated or unsaturated diolefine carboxylic acids into the molecule.

Using these materials the difficulties referred to above are obviated. The binder according to the invention provides a single-component system so that the question of incompatibility with another component can never arise. These binders guarantee satisfactory hardening (cross-linking) of the lacquer film, and single-component system so that the question of incompatibility with another component can never arise. These binders guarantee satisfactory hardening (cross-linking) of the lacquer film, and thus yield completely hard lacquer finishes.

The presence of carboxyl groups in the binders is necessary in order to obtain satisfactory film hardness. Cross-linkable alkyd resins containing aromatic carboxyl groups have proved to be of particular advantage. There is no need to add catalysts to these lacquer binders. The self cross-linking alkyd resins used in accordance with the invention must have an OH-number of between 20 and 180. This is necessary in order to obtain an adequate number of reactive sites for the cross-linking reaction. Their average molecular weight should be between 500 and 10,000 because it is only in this range that the resulting lacquers show outstanding properties. Their average molecular weight is preferably between 1500 and 3000. The self cross-linking alkyd resins used in accordance with the invention may be obtained from alkyd resins with molecular weights in the aforementioned range, an acid number of between 5 and 60 and an OH-number of between 40 and 250, by reacting them with alpha-alkoxy-alkyl isocyanates in an inert solvent at temperatures in the range of from approximately 30° C. to 60° C. The isocyanate is preferably used in a quantity of between 0.1 and 0.9 mol per gram-equivalent of hydroxyl in the alkyd resin, and with particular advantage in a quantity of between 0.4 and 0.6 mol. Alkyd resins whose carboxyl groups are aromatic in character, being derived for example from co-condensed or added phthalic acid, are particularly suitable. Another group of particularly suitable alkyd resins contains aliphatic, cycloaliphatic or aromatic halogen-carboxylic acids in either co-condensed or added form. Alkyd resins with aliphatic carboxyl groups, for example derived from adipic acid, may also be used. Suitable alkyd resins are, for example, those prepared from polycarboxylic acids such as adipic acid, succinic acid, maleic acid, phthalic acid, isophthalic acid, terephthalic acid, tetrachlorophthalic acid, hexahydrophthalic acid, hexachloroendomethylene tetrahydrophthalic acid, trimellitic acid, pyromellitic acid and polyhydric alcohols such as ethylene glycol, butanediols, hexane diols, 2,2-dimethylpropane-1,3-diol, diethylene glycol, di-β-hydroxyethylene butanediol, tripropylene glycol, xylylene glycol, glycerol, trimethylol propane, pentaerythritol, mannitol and their hydroxyalkylation products; polyesters of hydroxypivalic acid, thioglycollic acid, ω-hydroxydecanoic acid, caprolactone and diketene; polyesters of the above-mentioned dicarboxylic acids and polyphenols such as hydroquinone, 4,4'-dihydroxydiphenyl or bis-(4-hydroxyphenyl)-sulphone, polyesters modified with fatty acids ("oil alkyds") as well as naturally occurring saturated or unsaturated polyesters, their degradation products or ester interchange products with polyols such as castor oil, tall oil, soya oil, linseed oil, etc.; polyesters of carbonic acid which are obtainable in known manner from hydroquinone, diphenylol propane, p-xylylene glycol, ethylene glycol, butanediol or hexane diol-1,6- and other diols by the usual condensation reaction, e.g. with phosgene or diethyl or diphenyl carbonate, or from cyclic carbonates such as glycol carbonate or vinylidene carbonate by polymerization; polyesters of silicic acid, e.g. from dimethyl dichlorosilane and polyfunctional alcohols or phenols of the above-mentioned kind; polyesters of phosphonic acids, e.g. of methane, ethane, $\beta$-chloroethane, benzene or styrene phosphonic acid, phosphonic acid chloride or phosphonic acid esters and polyalcohols or polyphenols of the above-mentioned kind; polyesters of phosphorous acid obtained from phosphorous acid, phosphorous acid esters, ester amides or ester chlorides and polyalcohols, polyether alcohols and polyphenols; polyesters of phosphoric acid, e.g. from polyesters of phosphorous acid by oxidation or by ester interchange of phosphoric acid esters with alcohols or polyphenols; polyesters of boric acid; polysiloxanes, e.g. the products obtained by hydrolysis of dialkyldichlorosilanes with water followed by treatment with polyalcohols, or by addition of polysiloxane dihydrides to olefines, such as allyl alcohol or acrylic acid.

In addition, the alkyd resins may be modified by suitable fatty acids, such as, for example, pelargonic acid, capric acid, undecyclic acid, lauric acid, tridecoic acid, myristic acid, pentadecanoic acid, palmitic acid, margaric acid, stearic acid, nondecylic acid, arachidic acid, behenic acid and mixtures of any of the above.

Any suitable alpha-alkoxyalkyl isocyanates may be used for the process according to the invention such as those disclosed in German patent specification No. 1,205,087 and in United States application Serial No. 524,467, and also ethoxymethyl isocyanate, propoxymethyl isocyanate, hexoxymethyl isocyanate, dodecyloxymethyl isocyanate and, preferably, methoxymethyl isocyanate as well as $\alpha$-methoxyethyl isocyanate, $\alpha$-ethoxyethyl isocyanate and $\alpha$-butoxyethyl isocyanate and the like.

Lacquers based on the self cross-linking alkyd resins according to the invention show considerable advantages over conventional alkyd resin/aminoplast combinations in regard to the hardness and elasticity of the resulting lacquer films. Whereas it is not possible in the case of the alkyd resin/aminoplast combination to combine extreme hardness and high elasticity, it is possible by using the self cross-linking alkyd resins to obtain coatings which very effectively combine both these properties. The self cross-linking alkyd resins also provide for other improvements as they impart a high gloss to the lacquer film which is retained under thermal stress. The same applies as regards the resistance to yellowing of white lacquers. Since the new binders according to the invention are single-component systems, they afford further advantages in the preparation, storage and processing of the lacquers.

Another advantage of the new binders is that they show an improved resistance to water, 5 percent acetic acid, 5 percent sodium hydroxide and trisodium phosphate solutions.

Suitable lacquer solvents include all the solvents normally used for this purpose, for example, hydrocarbons such as benzene, toluene, xylene and aromatic naphthenes; esters such as ethyl-, butyl-, amyl-, ethoxyethyl- or methoxyethyl-acetate, -lactate or -propionate; ketones such as acetone, methylisopropyl ketone, methylisobutyl ketone, dioxane isophorone or cyclohexanone; alcohols such as n-butanol, t-butanol, isopropyl alcohol, n-propyl alcohol, amyl alcohol, cyclohexanol and diacetone alcohol; ethers such as the monoethyl-, monomethyl- and monobutyl-ethers of ethylene glycol, and mixtures of all these solvents.

Any inorganic and organic pigments may be used for pigmentation. Fillers and extenders may also be used.

The stoving lacquers based on the self cross-linking alkyd resins according to the invention may be applied to the substrates to be coated by any appropriate method, for example by brush-coating, spraying, dipping or roll-coating. Following the airing time normally allowed for stoving lacquers, the films are generally stoved for about e.g. 10 to 5 minutes at temperatures between 100 and 180° C.

COMPARISON EXAMPLES

The following table provides a comparison of the hardness of lacquer films obtained from a spontaneously cross-linking alkyd resin with an extremely small carboxyl-group content (1) a similar resin with aliphatic carboxyl groups emanating from adipic acid (2) and an identical alkyd resin with aromatic carboxyl groups derived from phthalic acid (3).

|  | Percent methoxymethyl isocyanate content | Type of carboxyl group | Acid no. of binder used | Film hardness after 30 min. stoving at 150° C. |
|---|---|---|---|---|
| (1) Spontaneously cross-linking alkyd resin. | 10 | Aromatic | Approx. 1 | Tacky. |
| (2) Spontaneously cross-linking alkyd resin. | 10 | Aliphatic | Approx. 12 | Soft. |
| (3) Spontaneously cross-linking alkyd resin. | 10 | Aromatic | Approx. 12 | Hard. |

The table shows that film hardness is considerably improvide when a sufficient number of carboxyl groups are present in the lacquer.

Lacquer films based on mixtures of alkyd resin and melamine resin are compared in the following table with lacquer films based on spontaneously cross-linking alkyd resins:

| Binder | Percent methoxymethyl isocyanate content | Percent melamine resin content | Koenig's pendulum hardness (in.) | Erichsen impression, mm. | Bond strength |
|---|---|---|---|---|---|
| Alkyd resin/melamine resin | | 25 | 61 | 5.7 | Poor. |
| Spontaneously cross-linking alkyd resin | 10 | | 67 | 8.9 | Very good. |
| Alkyd resin/melamine resin | | 25 | 123 | 3.9 | Poor. |
| Spontaneously cross-linked alkyd resin | 6.5 | | 114 | 7.9 | Very good. |

| Binder | Gloss after 30 min. at 150° C. | Gloss after 30 min. at 220° C. | Gloss retention after 72 hours at 180° C. | Yellowing Elrepho (filter 7-1) 30 min. at 150° C. | 72 hours at 180° C. |
|---|---|---|---|---|---|
| Alkyd resin/melamine resin | 67 | 21 | 17 | −8.1 | −15.8 |
| Spontaneously cross-linking alkyd resin | 77 | 72 | 70 | −7.8 | −9.7 |
| Alkyd resin/melamine resin | 65 | 39 | 21 | −7.8 | −13.7 |
| Spontaneously cross-linking alkyd resin | 75 | 73 | 69 | −8.0 | −9.8 |

Different alkyd resins in combination with a butylated melamine formaldehyde resin were used for the comparison tests. The reaction products of the alkyd resins with methoxymethyl isocyanate were used without any aminoplast added to them. Although there is no need to add aminoplast to spontaneously cross-linking alkyd resins, this would in principle be quite possible because all the resins showed outstanding compatibility with amino resins.

Lacquer films obtained by spraying suitable white lacquers onto glass plates, were used to assess hardness, gloss and gloss retention. Erichsen impression and bond strength were measured on films applied to 0.5 and 0.1-mm.-gauge steel sheet. Each test specimen was stoved for 30 minutes at 150° C. after approximately 10 minutes' airing.

König's pendulum hardness was used to assess film hardness.

The elasticity of the coatings was compared on the basis of the impression obtained with an Erichsen gauge.

The lattic sectio was used to assess bond strength.

Gloss and gloss retention were measured with a Gardner gauge (20°-angle).

Yellowing of the white lacquers was measured with an electric remission photometer (Elrepho) of the kind manufactured by Messrs. Carl Zeiss.

If desired, a catalyst may be used in a catalytic amount and preferably in an amount of from about 0.1 percent to about 5 percent by weight in order to bring about hardening of the stoving lacquers. Any suitable organic or inorganic acid catalyst, their salts, chlorides, and the like may be used such as, for example, hydrochloric acid phosphoric acid, tartaric acid, p-toluene sulphonic acid, p-toluene sulfuric acid chlorides and the like.

The process of the invention will be explained more fully below with the aid of the following examples where parts are by weight unless otherwise specified.

Example 1.—White lacquer

About 90 parts of an alkyd resin of trimethylol propane, phthalic anhydride, adipic acid and a saturated $C_7$–$C_{11}$ fatty acid fraction, the resin having an oil length of 25 percent, an acid number of 14, a viscosity of approximately 36 seconds (as measured on a 50 percent solution in xylene in a DIN-4-beaker at 20° C.) and an OH number of approximately 150, are reacted while stirring at from about 30° C. to about 60° C. with about 10 parts of methoxymethyl isocyanate in the form of a 75 percent solution in xylene.

About 150 parts of titanium dioxide (rutile) and about 0.8 part of calcium naphthenate (4 percent Ca, liquid), are added to about 100 parts of the spontaneously crosslinking alkyd resin thus prepared in the form of a 75 percent solution in xylene. This mixture is grounded twice on a three-roll mill.

The resulting paste is made into a lacquer with about 150 parts of the spontaneously cross-linking alkyd resin, in the form of a 75 percent solution in xylene, and following the addition of: about 2 parts of silicone oil, i.e. a crude hydrolysis product of dimethylidichlorosilane in the form of a 1 percent solution in xylene, about 50 parts of xylene, about 5 parts of butanol, and about 7.5 parts of butyl glycolate is adjusted with xylene to a spraying viscosity of about 20 seconds, as measured in a DIN-4-beaker.

To test its properties, the lacquer was sprayed both onto glass plates and onto 0.1 and 0.5 mm.-gauge steel sheets. About 15 minutes of airing are followed by about 30 minutes of stoving at about 150° C. The resulting films are distinguished by their high gloss, gloss retention and resistance to yellowing under thermal stress, by their outstanding elasticity and bond strength, and by their high resistance to solvents and chemicals.

If, in the aforementioned lacquer formula, the reaction product according to the invention with methoxymethyl isocyanate is replaced by an equivalent quantity of a combination of about 75 parts of the initial or basic alkyd resin with about 25 parts of a melamine resin (all parts being based on solids content), lacquer films are obtained which are distinguished from those provided by the lacquer according to the invention by their inferior gloss, elasticity, gloss retention, resistance to yellowing and bond strength.

Example 2.—Blue lacquer

About 142 parts of titanium dioxide (rutile), about 8 parts of phthalocyanine blue and about 0.8 part of calcium naphthenate (4 percent Ca, liquid), are added to about 100 parts of the spontaneously cross linking alkyd resin prepared as described in Example 1 in the form of a 75 percent solution in xylene. This mixture is ground twice on a three-roll mill. The resulting paste is made into a lacquer as described in Example 1 and adjusted to the spraying viscosity.

In addition to the excellent properties described in Example 1, the stoved blue lacquer films show a particularly brilliant gloss.

A lacquer based on the alkyd resin/aminoplast combination used for comparison employing the basic alkyd resin described earlier on, yields films which are slgihtly "fogged" and not as glossy.

Example 3.—Primer

About 144 parts of heavy spar, about 27.5 parts of titanium dioxide, about 45.5 parts of lithophone Rotsiegel, about 5.0 parts of kieselghur, about 2.7 parts of talcum (5 micron particle size), about 1.3 parts of aerosil 2491/380 and about 3.0 parts of butyl glycolate, are added to about 100 parts of the spontaneously crosslinking alkyd resin prepared as described in Example 1, in the form of a 75 percent solution in xylene. After the mixture has been ground three times on a single-roll mill, it is diluted with xylene to the spraying viscosity.

The stoved coatings are extremely hard and at the same time show outstanding bond strength and elasticity. Their resistance to solvents and chemicals is extremely high.

Despite its comparable hardness, a similarly prepared primer based on an alkyd/aminoplast combination using the basic alkyd resin described earlier is dinstinctly inferior in regard to its bond strength and elasticity.

Example 4

About 93.5 parts of an alkyd resin of trimethylol propane, 1,3-butylene glycol, pentaerythritol, phthalic anhydride, benzoic acid and a low-boiling $C_8$–$C_{12}$ coconut oil fatty acid fraction, the alkyd resin having an oil length of 24 percent, an acid number of 12, a viscosity of approximately 68 seconds (as measured on a 50 percent solution in xylene in a DIN-4-beaker at 20° C.) and an OH-number of approximately 60, are reacted while stirring at about 30° C. to about 60° C. with about 6.5 parts of methoxymethyl isocyanate in the form of a 60 percent solution in xylene.

About 125 parts of the spontaneously cross-linking alkyd resin thus prepared, in the form of a 60 percent solution in xylene, are rubbed with titanium dioxide, made into a lacquer with about 187.5 parts of resin and adjusted to the spraying viscosity, as described in Example 1.

The stoved lacquer films are extremely hard and at the same time show outstanding elasticity and bond strength. The comparison lacquer prepared from the basic alkyd resin in combination with a melamine resin provides lacquer films which, though somewhat harder, are distinctly inferior in their elasticity and bond strength.

Example 5

About 90 parts of an oil-free alkyd resin of trimethylol propane, neopentyl glycol, adipic acid and isophthalic acid, with an acid number of 15, a viscosity of between 250 and 300 seconds (as measured on a 60 percent solution in xylene/butyl acetate (9:1) in a DIN-4-beaker at 20° C.) and an OH-number of approximately 140, are reacted while stirring at from about 30° C. to about 60° C. with about 10 parts of methoxymethyl isocyanate in the form of a 60 percent solution in xylene.

About 125 parts of the spontaneously cross-linking alkyd resin thus prepared, in the form of a 60 percent solution in xylene are ground with titanium dioxide, made into a lacquer with about 187.5 parts of resin and adjusted to the spraying viscosity, as described in Example 1.

In addition to a high gloss, the stoved lacquer films based on the spontaneously cross-linking alkyd resin described above show a particularly outstanding elasticity and bond strength.

The lacquer films prepared for comparison from the basic alkyd resin in combination with different melamine resins show little or no gloss. Consistent with the incompatibility between alkyd resin and aminoplast reflected in the lack of gloss, the mechanical properties of these films are distinctly inferior to those of lacquer films based on the spontaneously cross-linking alkyd resin described above.

PREPARATION OF THE SPONTANEOUSLY CROSSLINKING ALKYD RESINS

Example 6

93.5 parts by weight of an alkyd resin of trimethylol propane, 1,3-butane diol, phthalic anhydride, benzoic acid and dehydrated castor oil, with an oil content of approximately 32% by weight, an acid number of 35, a viscosity of 90 seconds (as measured on a 50% by weight solution in xylene at 20° C. in a DIN-cup 4), and an OH-number of about 96, are reacted with stirring at 30–60° C. with 6.8 parts by weight of methoxymethyl isocyanate (MMI) in the form of a 60% by weight solution in xylene.

Example 7

39.5 parts by weight of an alkyd resin of trimethylol propane, 1,3-butane diol, phthalic anhydride, benzoic and dehydrated castor oil, with an oil content of approximately 32%, an acid number of 35, a viscosity of 90 seconds (as measured on a 50% by weight solution in xylene at 20° C. in a DIN-cup 4), and an OH-number of approximately 96, are reacted with stirring at 30–60° C. with 6.8 parts by weight of methoxymethyl isocyanate (MMI) in the form of a 60% by weight solution in xylene.

PREPARATION OF A LACQUER

Example 8

890 parts by weight of an alkyd resin of trimethylol propane, phthalic anhydride, adipic acid and a saturated fatty acid fraction with a C-atom chain length of $C_7$-$C_{11}$, with an oil length of 25%, an acid number of 10–15, a viscosity of approximately 36 seconds (as measured on a 50% by weight solution in xylene at 20° C. in a DIN-cup 4) and a OH-number of approximately 150, are reacted with stirring at 30–60° C. with 10 parts by weight of methoxymethyl isocyanate (MMI) in the form of a 75% by weight solution in xylene.

7 parts by weight of ethylene glycol, 7 parts by weight of butanol, 7 parts by weight of ethanol and 1 part by weight of a 1% by weight solution of silicone oil in xylene, are added to 100 parts by weight of a 60% by weight solution of an alkyd resin according to Examples 6 to 8. 4.8 parts by weight of a 15% by weight p-toluene sulphonic acid solution are added before processing.

The lacquers thus prepared were compared with the alkyd resins of Examples 6 to 8 without the described reaction with methoxymethyl isocyanate, in the usual combination with a plasticised urea resin, according to the following formula:

60 parts by weight of a 60% by weight alkyd resin solution,
40 parts by weight of a 60% by weight solution of a non-plasticised urea resin,
7 parts by weight of ethyl glycol,
7 parts by weight of butanol,
7 parts by weight of ethanol,
1 part by weight of a 1% by weight silicone oil solution in xylene.

Before processing, the lacquers thus prepared are catalysed with 4.8 parts by weight of a 15% by weight p-toluene sulphonic acid solution.

Comparison of the lacquer properties shows that acid-catalysed lacquers prepared from spontaneously crosslinking alkyd resins in accordance with Examples 6 to 8, produce films which are far more resistant to water and alcohols than the conventional alkyd resin/aminoplast combination. This superior resistance is coupled with a longer pot life, of more than 1 month, better resistance to wear and greater elasticity, although there is no difference in hardness.

In contrast to aminoplast combinations, it is possible by using spontaneously crosslinking alkyd resins to avoid the formation of formaldehyde which is known to be accompanied by a long lasting obnoxious odour.

It is, of course, to be understood that throughout the examples any suitable oil-modified or oil-free alkyd resin may be used in place of the alkyd resins used therein. Also, any of the alkoxyalkyl isocyanates may be used in place of those specifically set forth in the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A stoving lacquer composition which comprises the reaction product of an alkyd resin containing active hydrogen atoms which are reactive with NCO groups and an alpha-alkoxyalkyl isocyanate, said reaction product having an acid number of from about 5 to about 50, an hydroxyl number of from about 20 to 180 and an average molecular weight of from about 500 to about 10,000.

2. The composition of claim 1 wherein the alkyd resin is modified with a fatty acid.

3. The composition of claim 1 wherein the acid number of the reaction product is attributable to aromatic carboxyl groups present in the alkyd resin.

4. The composition of claim 1 wherein the acid number of the reaction product is attributable to haloaliphatic carboxylic acids, halocycloaliphatic carboxylic acids or haloaromatic carboxylic acids.

References Cited

UNITED STATES PATENTS

| | | | |
|---|---|---|---|
| 2,626,278 | 1/1953 | Wystrach et al. | 260—453 |
| 3,318,828 | 5/1967 | Seiner | 260—22 |

FOREIGN PATENTS

| | | |
|---|---|---|
| 1,034,693 | 6/1966 | Great Britain. |
| 1,205,087 | 11/1965 | Germany. |

DONALD E. CZAJA, Primary Examiner

R. W. GRIFFIN, Assistant Examiner

U.S. Cl. X.R.

117—124, 132, 134, 161, 167; 260—33.6, 40, 46.5, 47, 75, 77.5